United States Patent [19]

Walling

[11] 4,374,530
[45] Feb. 22, 1983

[54] FLEXIBLE PRODUCTION TUBING

[76] Inventor: John B. Walling, P.O. Box 16266, Fort Worth, Tex. 76133

[21] Appl. No.: 344,601

[22] Filed: Feb. 1, 1982

[51] Int. Cl.³ .............................................. F16L 11/08
[52] U.S. Cl. ................. 138/110; 137/355.26; 138/112; 138/121; 138/162; 138/174; 174/47; 239/197; 254/372
[58] Field of Search ...................... 137/355.16, 355.17, 137/355.26; 138/103, 106, 110, 111, 112, 118, 120, 121, 162, 172, 174, 178; 166/77; 174/47; 239/195, 197; 242/54 A; 254/372

[56] References Cited

U.S. PATENT DOCUMENTS

| | | | |
|---|---|---|---|
| 672,556 | 4/1901 | Hunick | 138/172 |
| 2,706,416 | 4/1955 | Stewart | 254/372 X |
| 2,842,768 | 7/1958 | Halperin | 242/54 A X |
| 3,400,737 | 1/1968 | Matthews et al. | 138/111 |
| 3,526,086 | 7/1970 | Morgan | 57/149 |
| 3,672,395 | 6/1972 | Fuetsch | 137/355.16 |
| 4,194,536 | 6/1980 | Stine et al. | 138/149 |
| 4,336,415 | 6/1982 | Walling | 174/47 |

FOREIGN PATENT DOCUMENTS

| | | | |
|---|---|---|---|
| 890228 | 1/1972 | Canada | 166/77 |
| 2838577 | 6/1979 | Fed. Rep. of Germany . | |

Primary Examiner—Stephen Marcus
Assistant Examiner—Mark Thronson
Attorney, Agent, or Firm—Dennis T. Griggs

[57] ABSTRACT

Flexible production tubing is wound about a reel for easy and convenient transport to and from a well site. A submersible pump is attached directly to the end of the flexible tubing and is lowered through the well casing to a producing formation. Insertion and withdrawal of the flexible tubing is accomplished with a hydraulically powered drive sprocket assembly mounted above the well head equipment. The flexible tubing is reinforced by striker plate assemblies which are engaged by the teeth of the drive sprocket, thereby providing positive traction for insertion and withdrawal without damaging the flexible core. The flexible production tubing includes a high strength injection core, a tubular production conduit embedded within the core, and a series of striker plate assemblies partially embedded within the core. Each striker plate assembly has a grooved face, with the plates being axially spaced with respect to each other along the length of the core, whereby the grooves of the striker plates are engaged successively by the teeth of the drive sprocket as the tubing is advanced or retracted.

8 Claims, 7 Drawing Figures

FLEXIBLE PRODUCTION TUBING

BACKGROUND OF THE INVENTION

1. Field of the Invention

The present invention relates generally to well production equipment, and in particular, to flexible production tubing in which a production conduit, power conductors, signal conductors and hydraulic/pneumatic conduits are integrated within a high tensile strength, flexible core.

2. Description of the Prior Art

Various types of artificial lifts are used to bring liquids to the surface of the earth when the pressure of the liquid-bearing reservoir is insufficient to produce the liquids by natural means. The pumping motion of the artificial lift may originate at the surface of the ground, or below as a result of the application of electrical or fluid power to a subsurface pump. In the subsurface-powered rig, a vertically reciprocating pump element at the bottom of the well is actuated by the application of electrical or pneumatic/hydraulic power to a subsurface pump. In the surface-powered rig, a vertically reciprocating pump element at the bottom of the well is actuated by a walking beam pivotally mounted on a Sampson post and connected at one end to the sucker rod string and at the other end to prime mover which supplies power through a Pittman gear for producing the reciprocating motion of the sucker rod string.

Generally, the prime mover consists of an internal combustion engine or electric motor. The cost of this prime mover, as well as its operation and maintenance, is, in many instances, a significant economic factor in the production of liquids from subterranean liquid-bearing reservoirs. The sucker rods are characterized by a short, fast stroke, resulting in low pump efficiency, high power consumption and low recovery rates. Additionally, the steel production rod tubing is subject to failure and must be repaired or replaced at substantial expense from time to time.

An additional limitation of surface-powered rigs which operate a sucker rod through rigid production tubing is that, for practical purposes, the weight of the sucker rod for wells having a producing formation at about ten thousand feet or deeper is excessive, resulting in stretching and early failure of the rods. Moreover, the sucker rod assembly is subject to severe wear in slant-hole or crooked-hole wells. In slant-hole wells, of the type typically drilled offshore, the sucker rod is subjected to severe frictional wear because of the slant of the hole, and is therefore subject to early failure and requires frequent replacement. Frictional wear is also a serious problem in crooked holes in which the well bore follows a helical path. Because of the difficulty of drilling a substantially vertical well at other than shallow depth, effective use of the sucker rod assembly is substantially limited to shallow wells.

For the foregoing reasons, there has been considerable interest in improving pumping systems in which the motive force is provided by electrical or pneumatic/hydraulic power applied to a subsurface pump, thereby eliminating the sucker rods and affording precise control of the pumping action.

Submersible pumps of the type in which the pumping force is derived from electrical, hydraulic, or pneumatic power applied downhole represent a significant improvement over the reciprocating sucker rod approach. According to conventional practice, a submersible pump which is driven down hole by electrical, hydraulic or pneumatic driving means is supported at the end of a long string of steel tubing joints which are coupled to each other by pin and box connections. Power conductors, signal conductors and hydraulic/pneumatic conduits coupled to the downhole pump are bundled together within an external umbilical cable assembly and are secured to the rigid production tubing joints.

Although large diameter steel production tubing has great strength and durability, it requires a substantial capital investment. The procedure of running rigid sections of production tubing into and out of the well bore is complicated by the external umbilical cable assembly. Moreover, the steel production tubing, as well as the pump, is subject to corrosion so that it may be necessary to pull the production tubing from the casing and repair the pump or replace damaged production tubing sections from time to time. When such workover operations become necessary, a portable installation called a workover rig must be brought to the well site and set up. Generally, these rigs consist of a heavy derrick or mast which support block and tackle arrangements that are operable to pull the pipe string from the well. The workover rigs are usually heavy and difficult to erect and must be capable of lifting the substantial load imposed by the rigid pipe string.

An overriding concern in the operation of a producing well is to get the necessary equipment into and out of the well as rapidly and safely as is economically possible. The efficiency of the pipe-handling operation is limited by such factors as the running speed of the hoist rig, the time required to make up or break tool joints during stabbing operations, the time required to mechanically couple and decouple the hoist rig and the pipe string, and the time required to transport lengths of pipe from the pipe string to a storage station during recovery operations and to transport lengths of pipe from the storage station to the pipe string during launching operations. As the length of the pipe string increases to reach the producing formation of deep wells, the pipe handling equipment must safely support the large load of the pipe string and permit the efficient execution of launching and recovery operations while preserving the structural integrity of the pipe string during the handling operations.

It will be appreciated that the substantial capital expenditure required for large diameter steel production tubing, and the expense associated with deployment, recovery, and repair or replacement of the rigid production tubing make its use prohibitive in low production wells, and account for a substantial percentage of the overall production costs of other wells.

OBJECTS OF THE INVENTION

It is, therefore, the principal object of the present invention to provide flexible production tubing in which the rigid production tubing and sucker rods are totally eliminated and are replaced by a flexible tubing assembly in which production conduit, electrical conductors, and/or hydraulic/pneumatic conduits are enclosed within a high strength flexible core.

A related object of the invention is to provide a flexible production tubing assembly which is capable of conveying fluids along plural flow paths while withstanding substantial tension loading.

Yet another object of the invention is to provide a flexible production tubing assembly which is adapted for downhole use in the presence of adverse pressure/temperature conditions and corrosive formation fluid.

Another object of the invention is to provide relatively lightweight, high tensile strength flexible production tubing which can be transported on a reel and which can be injected into and recovered from the well bore without the assistance of pipehandling hoist rigs.

An important object of the invention is to provide a flexible tubing assembly for conveying fluids along plural flow paths in an integrated assembly of a flexible production conduit, hydraulic/pneumatic conduits, power conductors and signal conductors, which are embedded within a high strength core, which completely replace the rigid production tubing and sucker rods, and which can be used at relatively great depths in both slant holes and in crooked holes.

Still another object of the invention is to provide an integrated flexible production tubing assembly which includes electrical conductors and/or hydraulic/pneumatic conduits, as well as a production conduit, wherein the flexible assembly can withstand substantial tension loading without pinching or otherwise restricting fluid flow through the production conduit or the hydraulic/pneumatic conduits.

Another object of the invention is to provide a flexible production tubing assembly which can be injected into and withdrawn from a well bore by a drive sprocket assembly.

SUMMARY OF THE INVENTION

The present invention is embodied in a flexible well production tubing assembly including a high strength injection core. Rigid production tubing and sucker rods are totally eliminated and are replaced by flexible production tubing in which a flexible production conduit, power conductors, signal conductors, and hydraulic/pneumatic conduits are embedded within the flexible, high tensile strength core. The flexible production tubing is coupled to a submersible pump which includes driving means such as an electrical motor, hydraulic motor or pneumatic motor which is driven down hole by electrical or hydraulic/pneumatic power which is transmitted through auxiliary conduits in the flexible production tubing assembly.

The flexible production tubing is wound about a reel for easy and convenient transport to and from a well site. A submersible pump is attached directly to the end of the flexible tubing and is lowered through the well casing to the producing formation. The weight of the submersible pump, which may amount to several hundred pounds, pulls the flexible tubing through the well without the requirements of snubbing. Withdrawal of the pump and flexible line from the well is easily accomplished without pipe string hoist equipment by rewinding the flexible production tubing around the reel.

Insertion and withdrawal of the flexible tubing is accomplished with a hydraulically powered drive sprocket assembly mounted above the well head equipment. The flexible tubing is reinforced by a series of striker plates which circumscribe the core. Each striker plate carries a groove which is engaged by the teeth of the drive sprocket, thereby providing positive traction without damaging the flexible core.

The novel features which characterize the invention are defined by the appended claims. The foregoing and other objects, advantages and features of the invention will hereinafter appear, and for purposes of illustration of the invention, but not of limitation, an exemplary embodiment of the invention is shown in the appended drawings.

DETAILED DESCRIPTION OF THE PREFERRED EMBODIMENT

Figure 1:
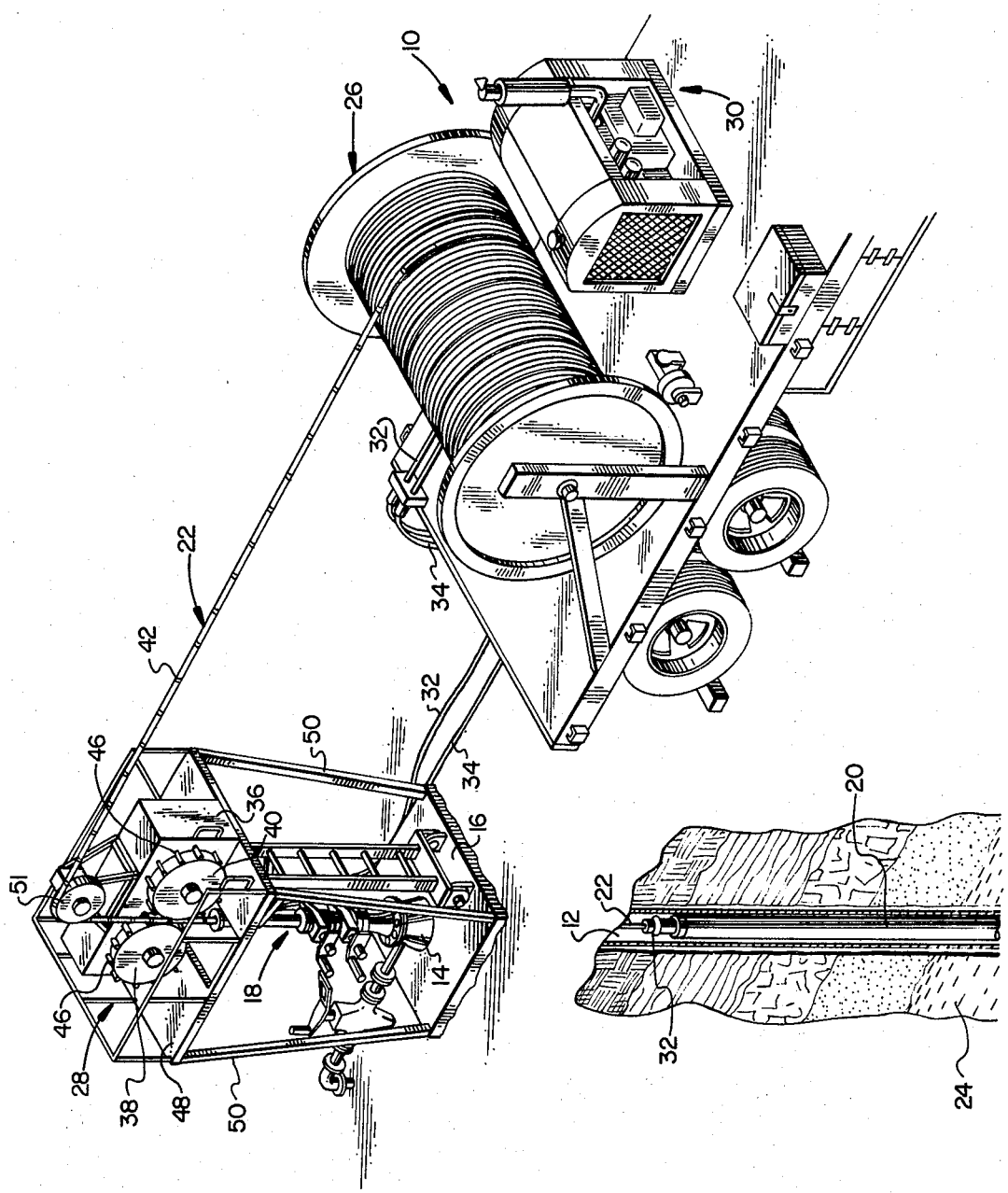
FIG. 1 is a perspective view which illustrates the installation of a submersible pump in a well bore in which the submersible pump is supported by a length of flexible production tubing.

In the description which follows, like parts are marked throughout the specification and drawings with the same reference numerals, respectively. The drawings are not necessarily to scale, and in some instances, portions have been exaggerated to more clearly depict certain features of the invention.

Referring now to FIG. 1, a pump installation rig 10 is set up adjacent a well site in which a well casing 12 is terminated by a lower well head flange 14 and is anchored to a concrete foundation block 16 in the usual manner. A slip and packer assembly 18 extends above the lower flange 14. Extending into the bore of the well casing 12 is a submersible pump 20 which is supported by a length of flexible production tubing 22 for recovering fluids and minerals from a producing formation 24. The pump 20 is inserted into and retracted out of the well casing 12 as the flexible tubing assembly in played out and taken up on a reel 26. The tubing 22 is engaged by a hydraulically powered sprocket drive assembly 28 and is inserted or retracted according to control signals generated at an operator console and power station 30. Pressurized hydraulic fluid is conducted from the control station 30 along conduits 32, 34 to a hydraulic drive motor assembly 36. The hydraulic drive motor assembly 36 is coupled to first and second drive sprockets 38, 40 which engage striker plates 42 carried by the flexible tubing 22.

The flexible tubing 22 is reinforced by the striker plate assemblies 42 which circumscribe the flexible core of the tubing assembly. The striker plates carry grooves 44 which are engaged by the teeth 46 of the drive sprockets 38, 40, thereby providing positive traction without damaging the flexible core of the production tubing 22.

The hydraulic drive motor assembly 36 is supported at an elevated position over the slip and packer assembly 18 on a platform 48. The platform 48 is supported by tower legs 50 which are anchored into the concrete block 16. Anchored onto the housing of the hydraulic sprocket drive assembly 28 is a free wheeling crown sheave assembly 51. The flexible tubing 22 is reaved around the sheave 51 and through the nip of the drive sprocket wheels 38, 40 into the slip assembly 18.

Figure 3:
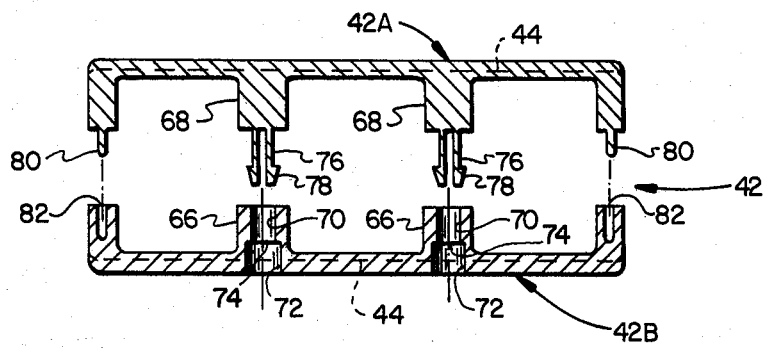
FIG. 3 is a partially exploded, sectional view of a striker plate assembly.
Figure 2:
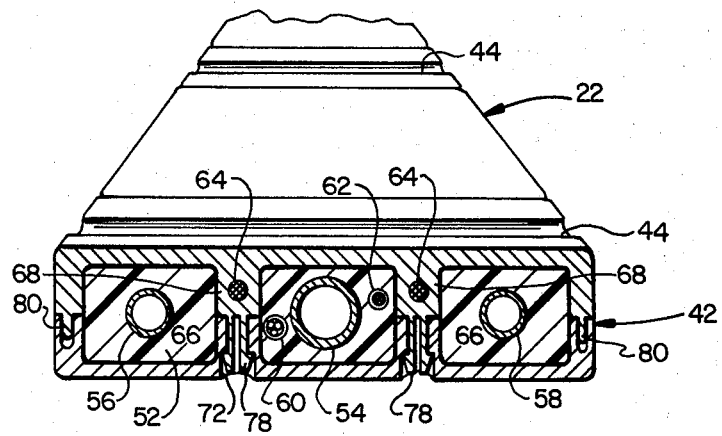
FIG. 2 is a perspective view, partly in section, of a length of flexible production tubing.
Figure 4:
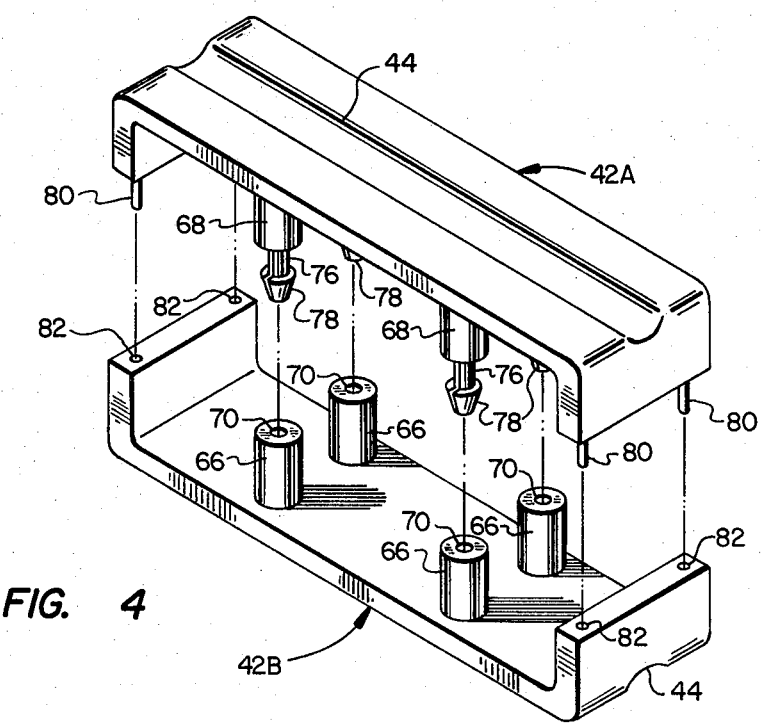
FIG. 4 is an exploded perspective view of a striker plate assembly.

Referring now to FIGS. 2, 3 and 4, the flexible production tubing assembly 22 includes a high strength injection core 52 of a durable material such as Nylon, in which a tubular production conduit 54 is embedded. Additionally, hydraulic charge and return conduits 56, 58 are also embedded within the injection core on opposite sides of the production conduit. A bundle of power conductors 60 and a bundle of signal conductors 62 are also embedded within the injection core 52.

According to a preferred embodiment, the production conduit 54 and the hydraulic conduits 56, 58 are welded steel tubing made of flat rolled, high strength, low alloy carbon steel having high ductility. In an alternate embodiment, the production conduit 54 comprises Nylon or Teflon polymer material.

The injection core 22 also comprises Nylon or Teflon polymer. Teflon polymer is preferred for high temperature, corrosive environment usage. For certain applications, the injection body 52 is reinforced with load bearing, high tensile tension members 64. The tension members preferably comprise a twisted weave rope of synthetic fiber strand material such as aromatic polyimide sold under the trademark Nomex or Kevlar by E. I. DuPont DeNemours. The flexible, load bearing tension members 64 extend axially along the length of the tubing core 52.

It will be appreciated that although the production tubing core 52 is durable and capable of substantial tension loading, it is susceptible to pinch damage. Moreover, when flexible steel tubing is utilized for the conduits, the flexible tubing 22 must be straightened as it is played off of the reel and injected into the well bore. The straightening procedure and handling is provided by the hydraulic sprocket drive assembly 28 in which the drive sprocket wheels 38, 40 inject and withdraw the tubing from the well. The sprocket teeth 46 grip and straighten the tubing as it is played off of the crown sheave 51.

Because of high tension loading, it will be appreciated that under some circumstances, the traction force developed during the insertion or withdrawal procedure would be great enough to cause the sprocket teeth 46 to pinch the injection core material 52, thereby weakening the injection core 52 and perhaps pinching the internal conduits. Moreover, it could be expected that a substantial amount of slipping could occur. Positive traction without the risk of damage to the core material 52 is provided according to the present invention by reinforcing the core with the striker plate assembly 42.

As can best be seen in FIGS. 3 and 4, the striker plate assembly 42 preferably includes an upper half plate 42A and a lower half plate 42B. The external face of each striker plate is provided with a groove 44 which runs along the length of the plate transverse to the longitudinal axis of the tubing core 52. The striker plates 42A, 42B are preferably constructed of high strength steel. Each striker plate assembly is partially embedded within the core 52 during manufacture. The striker plate assemblies are axially spaced with respect to each other along the length of the tubing core 52 whereby the grooves 44 can be engaged successively by the teeth 46 of the drive sprockets 38, 40.

The striker plate halves 42A, 42B each carry male and female fastener members 66, 68, respectively, which are also embedded within the core and are disposed in interlocking engagement.

As can best be seen in FIG. 3, the lower fastener member 66 is a female member having a bore 70 and a counterbore 72 separated by a shoulder 74. The upper fastener has a bifurcated male bayonet member 76 which deflects radially as it is inserted into the bore 70 of the lower fastener 66. Upon complete insertion, the tapered head 78 of the split bayonet latch 76 is locked into place by engagement with the shoulder 74 within the counterbore 72. Additionally, guide pins 80 carried at each end of each striker plate are received within blind bores 82 in the lower striker plate, which further strengthens the assembly.

As can best be seen in FIGS. 2 and 3, the upper and lower striker plate halves are generally C-shaped and when locked together, define a generally rectangular outline for circumscribing the rectangular injection core 52. Preferably, the striker plates 42A, 42B are assembled around the injection core 52 while the core material is in a plastic state, whereby the striker plates become at least partially embedded within the core material. The resulting assembly is sturdy and can be engaged repeatedly by the teeth of the drive sprockets, under load conditions, without slippage and without damage to the injection core.

Figure 7:
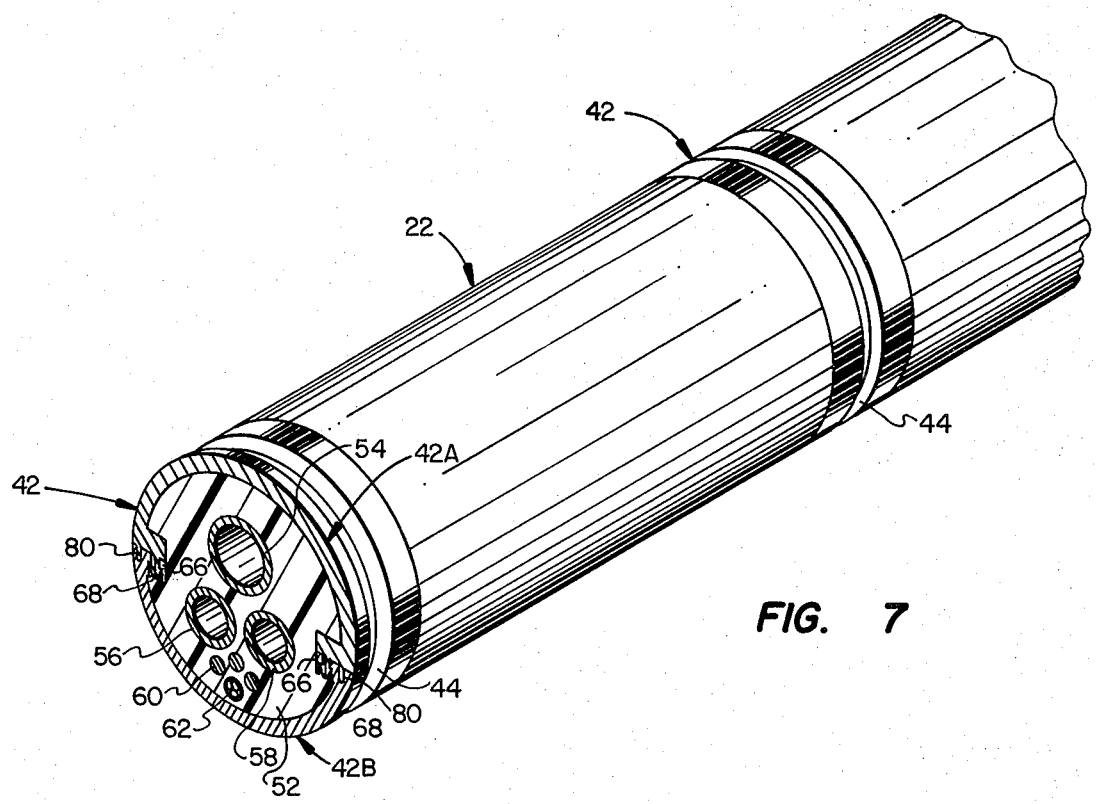

Referring now to FIG. 7, an alternate configuration for the flexible tubing assembly 22 is illustrated. In this arrangement, the injection core 52 is circular in cross-section, with the upper and lower striker plates 42A, 42B being circular in cross-section. In this arrangement, each end of each half plate is turned radially inwardly, and carries the interlocking male/female fastener member 66, 68.

Figure 6:
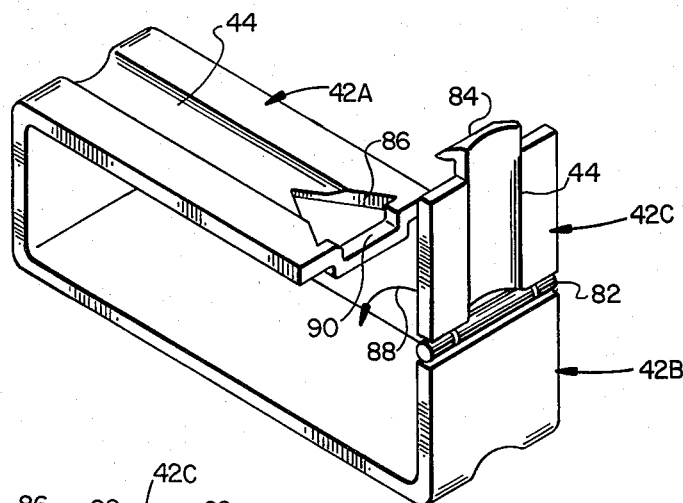
FIG. 6 is a perspective view of the striker plate assembly shown in FIG. 5; and, FIG. 7 is an alternate embodiment of a flexible tubing assembly having a circular cross-section and which has been reinforced by an alternate embodiment of the striker plate assembly.
Figure 5:
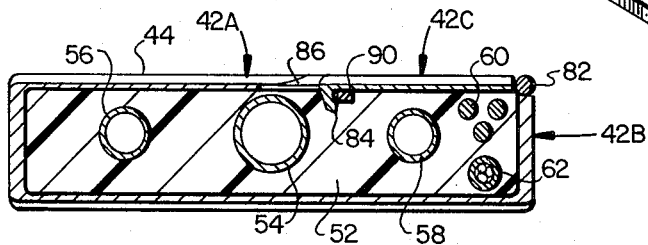
FIG. 5 is a sectional view of a flexible tubing assembly which has been reinforced by an alternate embodiment of a striker plate assembly.

An alternate embodiment of the striker plate assembly 42 is illustrated in FIGS. 5 and 6. In this arrangement, a portion of the upper striker plate assembly 42A is inwardly formed with the lower striker plate assembly 42B. A portion 42C of the upper striker plate is movably coupled in hinged engagement with the lower striker plate 42B. A hinge 82 couples striker plate portion 42C for pivotal movement relative to striker plate 42B. Striker plate portion 42C includes a transversely projecting tang 84 which is movable through an opening 86 in the striker plate portion 42C. During assembly, the striker plate assembly is fitted around the injection core 52 and the movable striker plate portion 42C is rotated counterclockwise in the direction indicated by the arrow 88 until the tang 84 penetrates the core 52 and interlocks with a latch portion 90 carried by the striker plate 42A.

Although certain preferred embodiments of the invention have been described in detail, it should be understood that various changes, substitutions and alterations can be made therein without departing from the spirit and scope of the invention as defined by the appended claims.

What is claimed is:

1. A composite, flexible tubing assembly for conveying formation fluid out of a well comprising, in combination:
   an injection body of high tensile strength, flexible material defining an elongated core;
   elongated production tubing embedded in said core; and,
   a plurality of striker plate assemblies partially embedded within said core, each striker plate assembly having an exposed face and a groove in said face extending transverse to the longitudinal axis of said core, said plates being axially spaced with respect to each other along the length of said core whereby the grooves of said striker plates can be engaged successively by the teeth of a drive sprocket.

2. The flexible tubing assembly as defined in claim 1, said elongated production tubing comprising extruded Nylon.

3. The flexible tubing assembly as defined in claim 1, said elongated production tubing comprising welded steel.

4. The flexible tubing assembly as defined in claim 1, including a plurality of high tensile strength strands embedded within said core.

5. The flexible tubing assembly as defined in claim 1, each striker plate assembly including first and second striker plates, a portion of the first striker plate being coupled in hinged engagement with the second striker plate, one of said striker plates having an opening exposing said core, and the other striker plate having a transversely projecting tang extending through said opening and intersecting said core.

6. The flexible tubing assembly as defined in claim 1, each striker plate assembly including first and second striker plates and male and female fastener members carried by said striker plates, said fastener members intersecting said core and disposed in interlocking engagement.

7. The flexible tubing assembly as defined in claim 6, wherein said core is rectangular in cross-section, and each striker plate assembly being rectangular in cross-section.

8. The flexible tubing assembly as defined in claim 6, wherein said core is circular in cross-section, and each striker plate assembly being circular in cross-section.

* * * * *